United States Patent [19]

Halvorsen

[11] 4,211,425
[45] Jul. 8, 1980

[54] REPLACEABLE COLLET IN DOUBLE DIAPHRAGM CHUCK

[75] Inventor: James V. Halvorsen, Springfield, Vt.

[73] Assignee: Bryant Grinder Corporation, Springfield, Vt.

[21] Appl. No.: 934,753

[22] Filed: Aug. 21, 1978

Related U.S. Application Data

[62] Division of Ser. No. 845,092, Oct. 25, 1977, Pat. No. 4,133,544.

[51] Int. Cl.³ ............................................. B23B 31/20
[52] U.S. Cl. ................................ 279/46 R; 279/41 R
[58] Field of Search .................... 279/41, 46 R, 41 A, 279/46 A

[56] References Cited

U.S. PATENT DOCUMENTS

| | | | |
|---|---|---|---|
| 2,562,455 | 7/1951 | Gridley | 279/46 |
| 2,873,121 | 2/1959 | Hahn | 279/46 X |
| 2,996,301 | 8/1961 | Cox | 279/46 |
| 3,411,796 | 11/1968 | Decker | 279/46 |
| 3,495,844 | 2/1970 | Dee | 279/46 |

FOREIGN PATENT DOCUMENTS 5870 of 1896 United Kingdom ..................... 279/41

Primary Examiner—William R. Briggs
Attorney, Agent, or Firm—Mitchell J. Hill; James H. Bower

[57] ABSTRACT

A work holder adapted to minimize clamp distortion of a workpiece by providing a movable metallic collet encompassing the workpiece, and a plurality of front and rear jaws to grip the metallic collet with different pressure forces at the front and rear sections of the collet.

2 Claims, 11 Drawing Figures

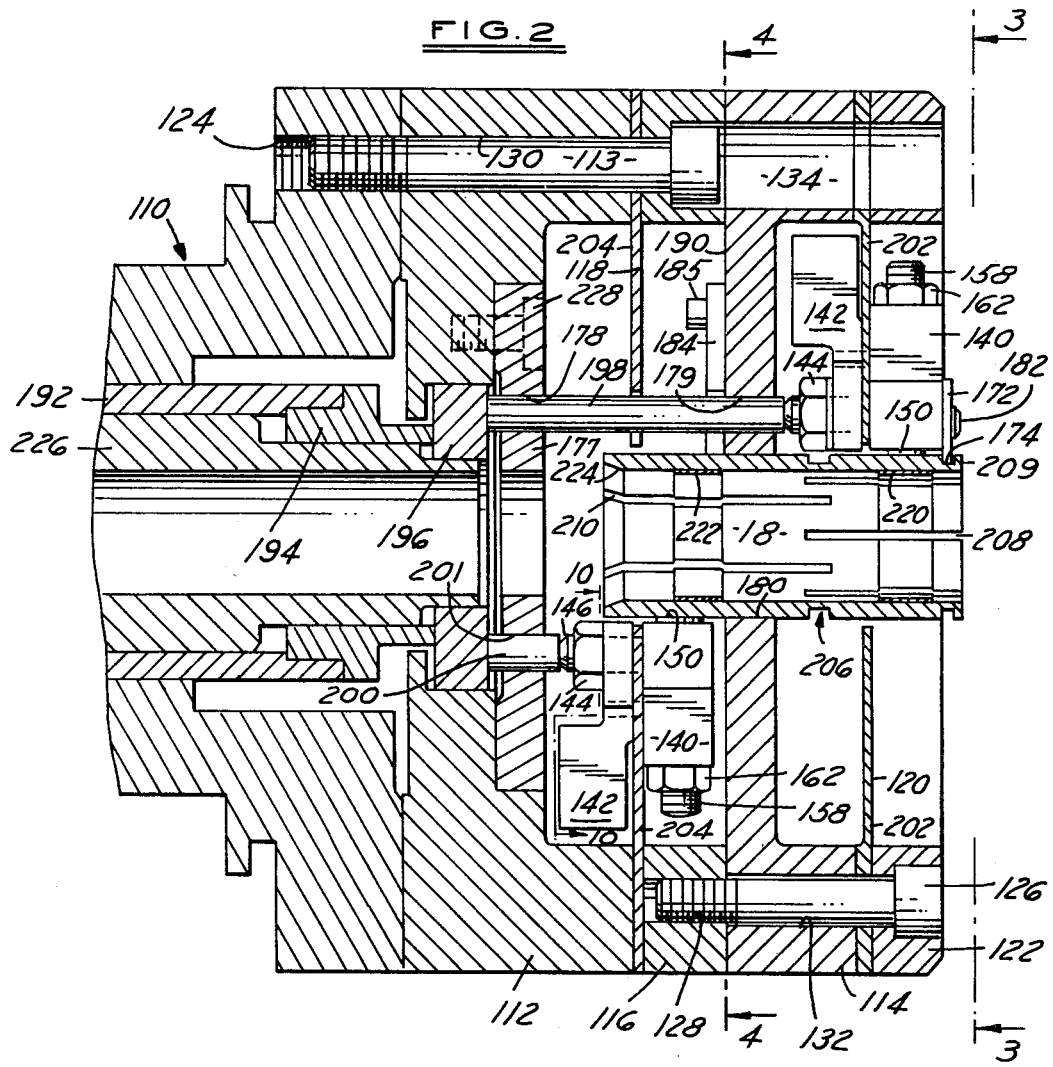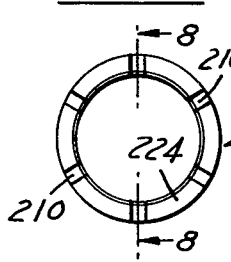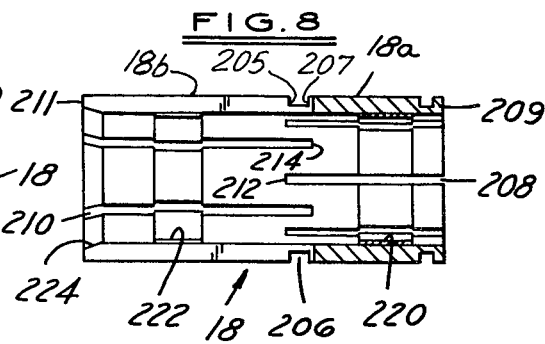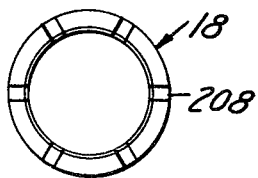

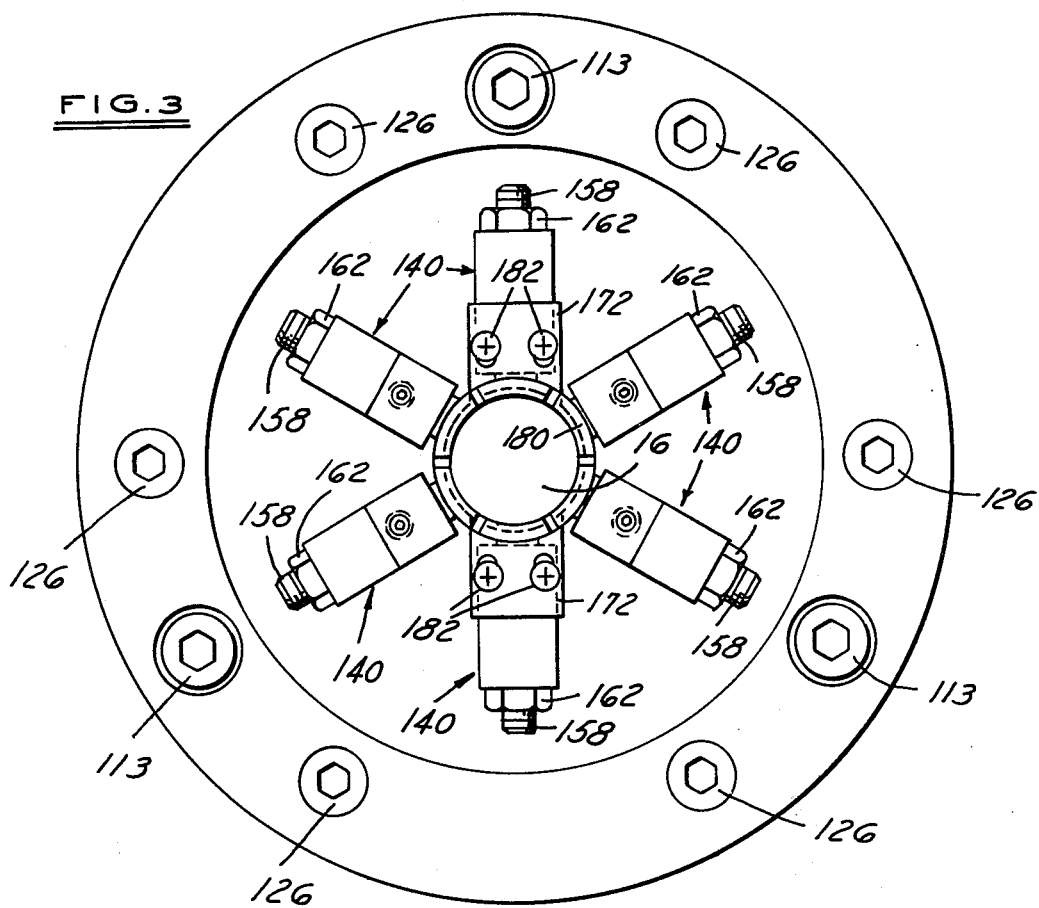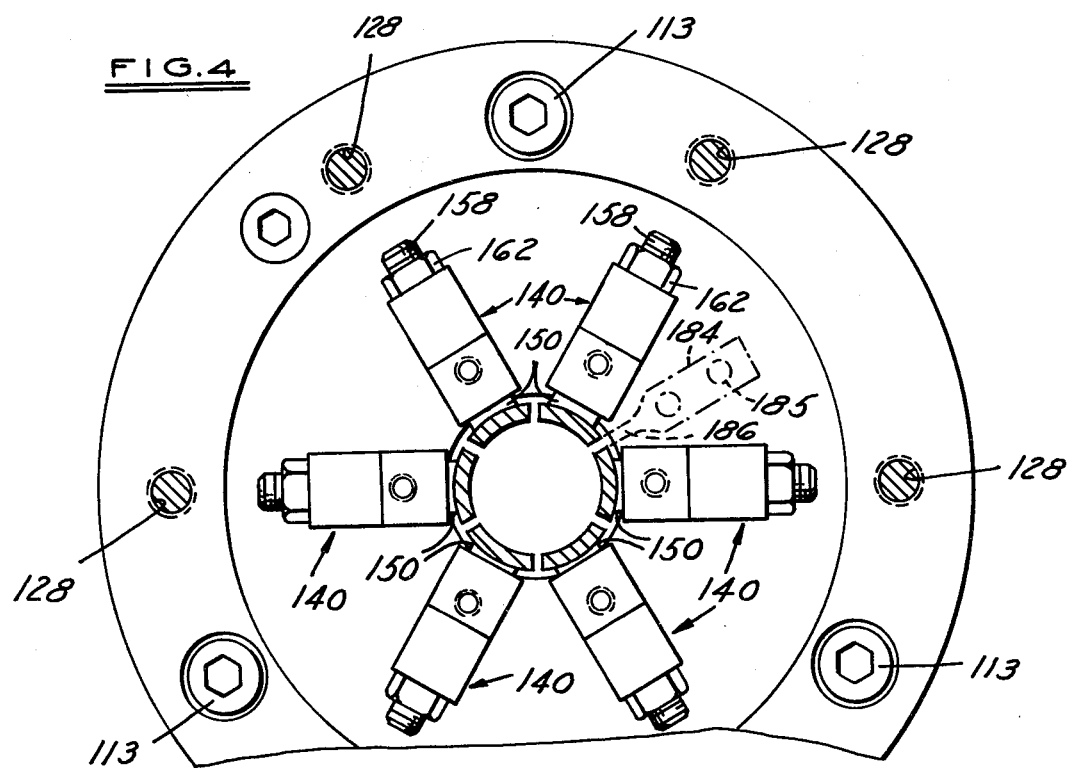

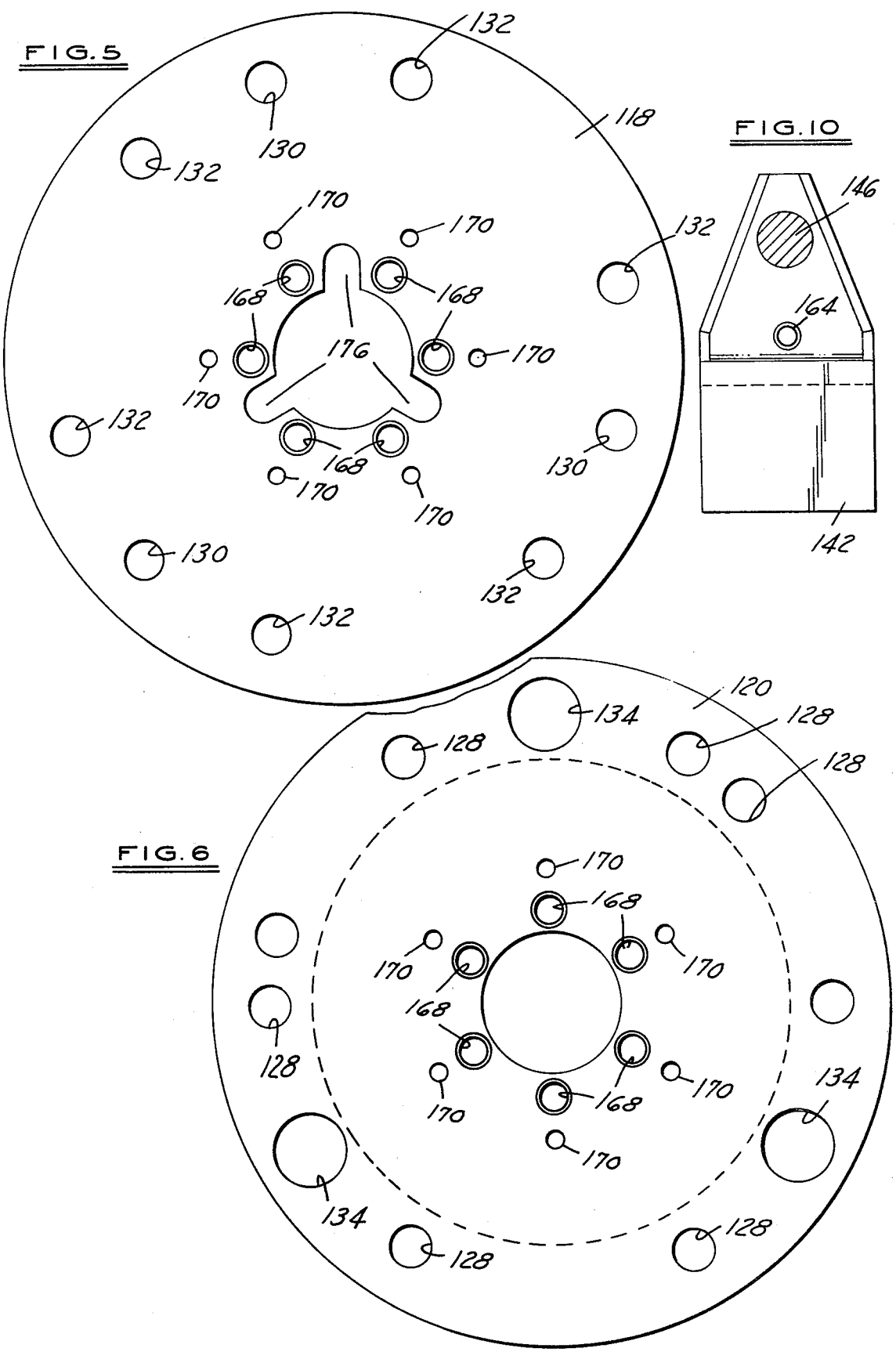

REPLACEABLE COLLET IN DOUBLE DIAPHRAGM CHUCK

This is a division of application Ser. No. 845,092, filed Oct. 25, 1977, now U.S. Pat. No. 4,133,544.

SUMMARY OF INVENTION

This invention relates to a collet type work-holding device with a double diaphragm. The collet is contained in a double diaphragm chuck with the chuck jaws pressing on the outer diameter of the collet forcing the fingers of the collet to securely hold the workpiece. Each diaphragm has six (6) jaws to grip a particular section of the workpiece. That is the front diaphragm, with the six jaws, is independently holding the front portion of the workpiece at a different force than the six jaws of the rear diaphragm assembly.

In view of the foregoing, it is an important object of the present invention to provide a novel and improved dual pressure work-holding device which overcomes the disadvantages of prior art work-holding devices using a single force throughout the entire length of the workpiece.

It is a further object of the present invention to provide a novel and improved dual pressure work-holding device which is simple in construction, economical and feasible to manufacture, and which is efficient, economical and reliable in operation.

Another object of the invention is that the double jaws with a split sleeve eliminates jaw wear problems by not allowing the jaw tips to grind down on the workpiece.

Another object of this invention is to permit reconditioning of the work-holding device to compensate for wear with a minimum interruption of production, by simply replacing the split sleeve instead of the conventional time consuming process of readjusting the jaw inserts and regrinding them in place on the machine. The worn split sleeve may be discarded or built up and reground off the machine.

Other features and advantages of this invention will be apparent from the following detailed description, appended claims, and the accompanying drawings.

BRIEF DESCRIPTION OF THE DRAWINGS

FIG. 2 is a broken, elevational sectional view of the work-holding apparatus modified.

FIG. 3 is a front view of FIG. 2.

FIG. 4 is a view taken along line 4—4 of FIG. 2.

FIG. 5 is a view of the rear or inside diaphragm.

FIG. 6 is a view of the front or outside diaphragm.

FIG. 7 is the rear end view of the split sleeve.

FIG. 8 is a cross-sectional view taken along line 8—8 of FIG. 7.

FIG. 9 is a front end view of the split sleeve.

FIG. 10 is an enlarged view of the counterweight.

BRIEF DESCRIPTION OF THE INVENTION

Figure 1:
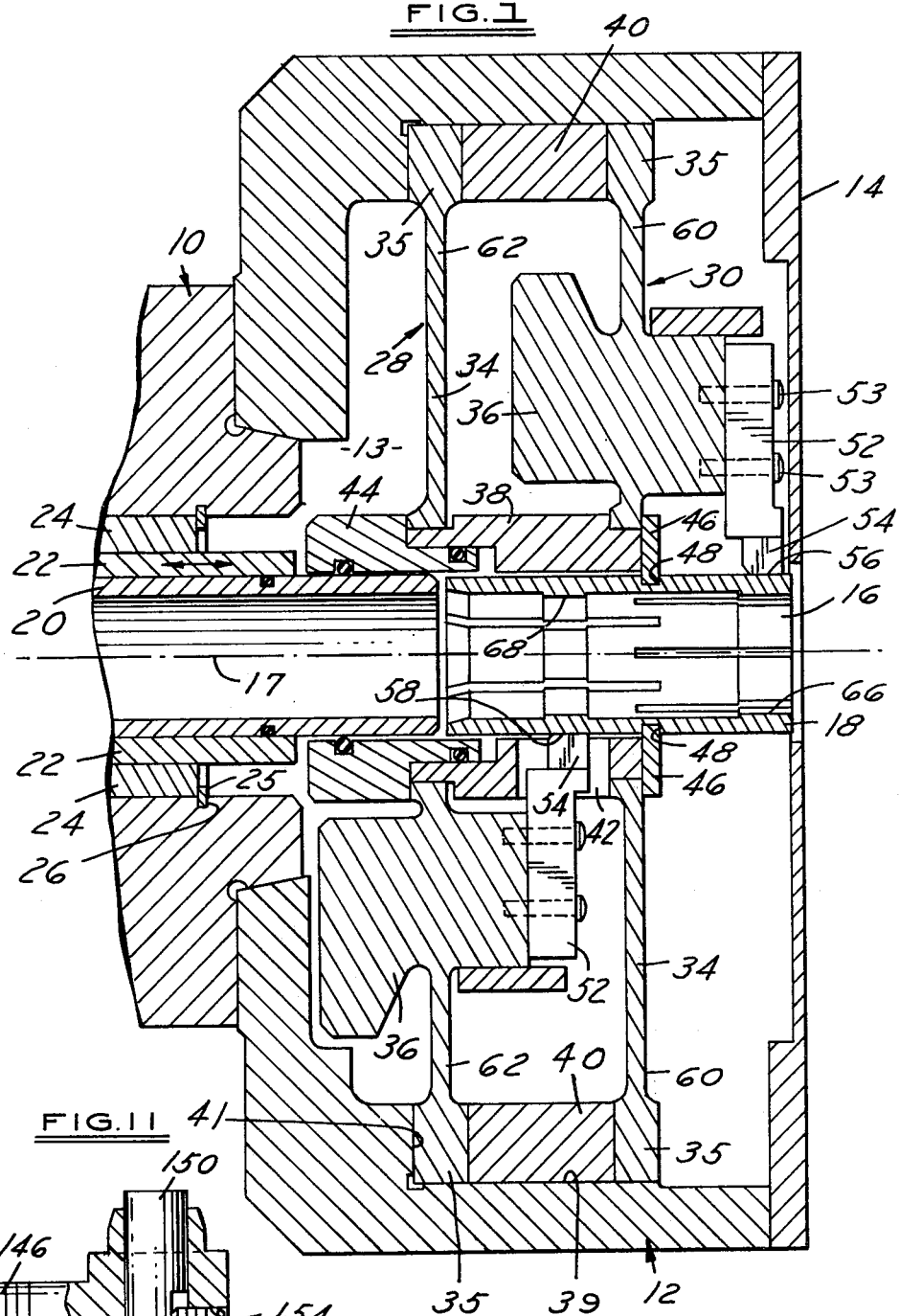
FIG. 1 is a broken, elevational sectional view of the work-holding apparatus made in accordance with the principles of the present invention.

Referring now to the drawings, and in particular to FIG. 1, the numeral 10 generally designates a work spindle; a diaphragm housing 12 is connected thereto. A shield 14 is connected to the outer rim of the diaphragm housing 12 and covers the diaphragm housing except for a central opening 16 to allow for the insertion and removal of workpieces into a sleeve or collet 18. A spring retracted actuator, now shown, is adapted to push the workpiece out of the bore 17 of sleeve 18 when the machining operation on the workpiece is completed. The actuator is adapted to reciprocate in cylindrical guide tube 20. A cylindrical push tube 22 is adapted to be operated by a cylinder, not shown, and automatically retracted by a spring means, also not shown. A cylindrical guide 24 encircles the push tube 22 on its inner surface and is retained in the work spindle 10 on its outer surfaces. The guide 24 is retained from axial movement and held in position by a retaining ring 25. The retaining ring is secured in recess 26 of work spindle 10.

A pair of jaw assemblies, the numeral 28 generally designates the rear jaw assembly, and the numeral 30 designates the front jaw assembly. Each jaw assembly has parallel component parts and the difference being that the rear jaw assembly is displaced 30 degrees from the front jaw assembly. Therefore, only one jaw assembly will be discussed; however, the numerals shall pertain to the other jaw assembly as well. The jaw assembly includes a diaphragm 34 which includes counterweights 36 which are integral parts of the diaphragm 34. The front and rear diaphragms are separated by an inner annular spacer 38 and an outer annular spacer 40 bolted (not shown) to the inner surface 39 of diaphragm housing 12. The inner annular spacer 38 has a plurality of recesses 42 which allow the jaws to press against the outer diametrical surface of sleeve 18 in a manner which is described in detail hereinafter.

A rear annular spacer 44 holds rear jaw assembly 28 in position while the inner annular spacer 38 separates the front and rear jaw assemblies 28 and 30, respectively. A retaining segment 46 positions the sleeve 18 axially by means of a recess 48 in sleeve 18. The retaining segment 46 is bolted (not shown) to the inner annular spacer 38. The outer portion 35 of diaphragm 34 is bolted (not shown), in a manner well known in the art, to the outer annular spacer 40 and inner abutting surface 41 of diaphragm housing 12.

Each diaphragm includes a plurality of counterweights 36 and each counterweight includes a jaw 52 attached thereto by bolts 53. Each jaw 52 includes a jaw tip 54 which is held by means well known in the art. Each jaw is therefore adapted to press against the outer diameter of sleeve 18 at points 56 and 58. The inner surface areas 66 and 68 opposite outer surface areas 56 and 58, respectively, on collet 18 are areas built up of metal, either sprayed on or machined, or plastic material that is permanently attached thereto. In operation, each diaphragm 34 normally made of metal is adapted to be deflected at points 60 and 62 by push tube 22 via spacers 44 and 38. The guide tube 20 is for the workpiece to be slid through the center of the spindle and has its own actuator to push the workpieces through the center of the spindle and jaw assemblies, respectively.

The push tube 22 pushes the spacers 44 and 38 and deflects more or less simultaneously each diaphragm 34 of the front and rear jaw assemblies, respectively. The flexing or deflection of each diaphragm 34 at points 60 and 62 causes the jaw tips 54 to pivot away or swing through an arc away from the outer diameter surface areas 56 and 58, respectively, of the sleeve 18. Moving the jaw tips 54 away from the surface of the sleeve relieves the gripping force on the collet or sleeve 18 and the workpiece then is discharged by the actuator (not shown) pushing a stack of workpieces through the guide tube 20. An arm (not shown) picks up the finished part and removes it from the spindle area. In the meantime, a new part or workpiece is centered within the sleeve or collet 18 before the jaw assemblies close down upon the collet to clamp the workpiece in preparation for the machining operations. The push tube, operated by an air cylinder (not shown) is retracted and the diaphragm return the jaw assemblies to the original clamp position.

DETAILED DESCRIPTION OF THE PREFERRED EMBODIMENT

Referring now to the drawings of the preferred embodiment, and in particular to FIG. 2, the numeral 110 generally designates a work spindle. Attached to the work spindle is a rear chuck body 112 and a front chuck body 114, with annular ring 116 between the front and rear chuck bodies. A rear diaphragm 118 is secured between the rear chuck body 112 and the annular ring 116 by plurality of bolts 113 threaded into threaded bores 124 of workspindle through bores 130 of rear chuck body. A front diaphragm 120 is secured between the front chuck body 114 and nose ring 122 by a plurality of bolts 126 threaded into threaded bore 128 in annular ring 116. Each bolt 126 passes through a bore 132 of front chuck body 114 into the threaded bore 128 on annular ring 116 to secure the front diaphragm. To reach each bolt 113, a passage way through front chuck body 114, front diaphragm 120 and nose ring 122 designated as 134 is provided.

Figure 11:
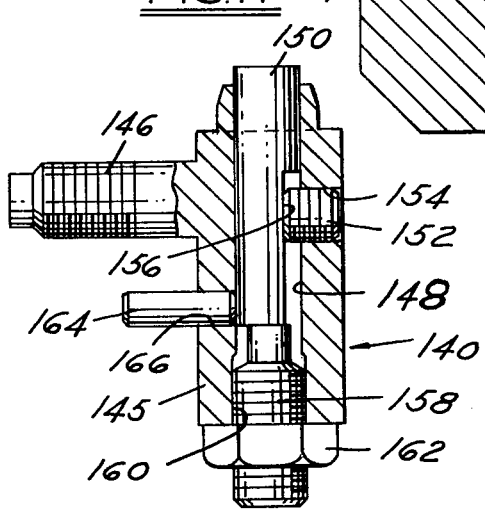
FIG. 11 is an enlarged view of the jaw assembly.

Each diaphragm has a jaw assembly 140 secured thereto and adapted to move a few thousandths of an inch in a manner to be described hereinafter. Each jaw assembly, as shown in FIG. 2, FIG. 3 and FIG. 4 is counterbalanced on the other side of the diaphragm by a counterweight 142, as shown in FIG. 2. A nut 144 is threaded onto shaft 146 of jaw assembly 140 to securely fasten each jaw assembly onto the diaphragm. As shown in FIG. 11, each jaw assembly 140 comprises a body 145 with a bore 148 extending axially therethrough. A jaw tooth 150 extends through one end of the jaw assembly 140 and is secured thereto by means of a set screw 152 threaded into threaded bore 154. The set screw is seated against the flat side 156 of jaw tooth 150 to prevent rotation of the jaw tooth. An adjusting screw 158 is threaded into threaded bore 160 at the other end of the jaw body 145. The adjusting screw is adapted to move the jaw tooth 150 axially to compensate for wear of the jaw tooth and is locked by a threaded nut 162. A pin 164 is wedged into side bore 166 and is secured thereto by means well known in the art. Shaft 146 and pin 164 of jaw assembly 140 are inserted into bores 168 and 170, respectively, of diaphragms 118 and 120. Thus each jaw assembly is connected to a counterweight 142 on the other side of the diaphragm. As shown in FIG. 5 and FIG. 6, the difference between the two diaphragms being a recess 176 in diaphragm 118 that accommodates pusher rod 198 shown in FIG. 2. Pusher rod 198 is adapted to move in bore 178 of disc 177 and bore 179 in front chuck body 114. Disc 177 is secured to the rear chuck body 112 by a plurality of screws 228.

To retain the collet or split sleeve in position to front diaphragm 120, one or more retaining segments 172 are secured to one or more jaw assemblies 140 by means of screws 182. Each retaining segment has one end that fits into a recess 174 of collet 18. A key 184 is fastened by screws 185 to the rear face 190 of front chuck body 114. The inner end 186 of key 184 fits into a recess (not shown) on the outside surface of the collet 18 to prevent the collet from turning or rotating on its axis. The collet 18 is further supported by being in a bore 180 of front chuck body 114.

Movement of the jaw assemblies on both front and rear diaphragms 120 and 118, respectively, is caused by movement of a cylinder (not shown) in response to a signal. The rod of a cylinder is adapted to be connected to the push tube 192 which in turn is adapted to move a rear annular spacer 194 which in turn is adapted to move a ring spacer 196. An elongated push rod 198 and a short push rod 200 are adapted to be moved simultaneously by the ring spacer 196 when the push tube 192 is moved axially. Movement of the push rods 198 is adapted to flex the front diaphragm 120 in area 202 on the diaphragm. Movement of the push rods 200 in bores 201 of disc 177 is adapted to flex the rear diaphragm 118 in area 204 on the diaphragm. Since the movement of the diaphragms is simultaneous, the forces squeezing the collet 18 are withdrawn, thus relieving the pressure on the workpiece held within the collet 18 and, consequently, the workpiece can be withdrawn and a new workpiece adapted to be placed in position.

In order for the invention to be effective, the collet 18 is designed to be provided with different pressure points or forces; that is, the pressure forces of the jaws on the front diaphragm can be greater than the pressure forces of the jaws on the rear diaphragm. However, the pressure forces can be reversed, if need be, or designed in any manner well known and recognized in the art. That is, each set of jaw teeth on one diaphragm is adjusted to be of a different pressure force than the other set of jaw teeth on the other diaphragm. The collet 18 therefore is adapted for pressure forces that vary from the front and rear areas of the collet 18 and is facilitated by the design of the collet in a manner to be described hereinafter.

The front and rear areas of the collet are separated by a circular channel 206 having a pair of opposing parallel side walls 205 and 207 connected by an annular wall 203 normal to the parallel side walls 205 and 207 and parallel to the outer diameter of the tubular body which provides for independent deflections of the front and rear areas of the collet. A plurality of frontal slits 208 extends axially from the front end face 209 and terminates at a rearwardly point 212 just past the point in which the circular recess 206 extends circumferentially around the outer diameter of the collet. A plurality of rear slits 210 extends axially from the rear end face 211 and terminates at a frontal point 214 just past the point in which the circular recess 206 extends circumferentially around the outer diameter of the collet. It is thus evident that the collet is adapted to be squeezed and expanded by applying two forces of varying pressure which are different from the front to the rear areas of the collet; that is, the front portion 18a of collet 18 is adapted to have different pressure forces applied to the outside of the collet than the rear portion 18b of the collet. The areas 220 and 222 designate radially extending areas that hold the workpiece. These areas can be machined or built up by means such as spraying of metal or spraying of plastic material onto the surface to provide a radially extending build-up of material that will hold the workpiece. Area 224 designates a bevelled portion, or sometimes called a belled portion, on the rear end face 211 of the collet and is provided for easier insertion of the workpiece as it enters the collet form the center rear of the spindle.

OPERATION OF THE INVENTION

As illustrated in FIG. 2, a workpiece is adapted to move axially through the guide tube 226 of the spindle 110 and eventually to be gripped by the collet 18. An arm, not shown, is adapted to be moved in position in front of the collet 18 and is adapted to prevent the workpiece from extending further than the required position for machining. The push tube, which has been moved axially to force the push rods against the jaws causing the diaphragms to flex outwardly at areas 202 and 204 of the diaphragms thus causing the jaws to release their pressure on the front 18a and rear 18b areas of the collet, allows the machined workpiece to be removed and the new unmachined workpiece to enter. Upon entering of the workpiece and its being stopped in position by the arm (not shown), the push tube is retracted, causing the front and rear jaws to press against the outer diameter of the collet 18, thus holding the new workpiece in position for machining. The arm is then withdrawn or retracted and the machining operations may begin.

While it will be apparent that the preferred embodiments of the invention herein disclosed are well calculated to fulfill the objects above stated, it will be appreciated that the invention is susceptible to modification, variation and change.

I claim:
1. A work holding collet, comprising:
   (a) an elongated tubular body;
   (b) a circumferential channel means on the outer diameter of said tubular body approximately midway between the ends of said tubular body for independent deflections of said front and rear ends of said collet;
   (c) a plurality of slots extending from the front end of said body extending approximately midway to a point beyond said circumferential channel;
   (d) a plurality of slots extending from the rear end of said body extending approximately midway to a point beyond said circumferential channel; and
   (e) said channel comprising a pair of opposing parallel sidewalls connected by an annular wall parallel to said outer diameter of said tubular body and normal to said pair of opposing parallel sidewalls.

2. A work holding collet, comprising:
   (a) an elongated tubular body;
   (b) a circumferential channel means on the outer diameter of said tubular body approximately midway between the ends of said tubular body for independent deflections of said front and rear ends of said collet;
   (c) a plurality of slots extending from the front end of said body extending approximately midway to a point beyond said circumferential channel;
   (d) a plurality of slots extending from the rear end of said body extending approximately midway to a point beyond said circumferential channel;
   (e) said circumferential channel comprising a pair of opposing parallel sidewalls connected by an annular wall parallel to said outer diameter of said tubular body and normal to said pair of opposing parallel sidewalls; and
   (f) a plurality of circumferential radially extending surface areas on the inner diameter of said body adapted to grip a workpiece.

* * * * *